(12) United States Patent
Parkes et al.

(10) Patent No.: US 8,658,269 B1
(45) Date of Patent: Feb. 25, 2014

(54) MAT WITH OVER-MOLDED WEB

(71) Applicants: Timothy H. Parkes, Chattanooga, TN (US); Willard K. Rice, III, Ooltewah, TN (US); Erik E. Anderson, Cleveland, TN (US)

(72) Inventors: Timothy H. Parkes, Chattanooga, TN (US); Willard K. Rice, III, Ooltewah, TN (US); Erik E. Anderson, Cleveland, TN (US)

( * ) Notice: Subject to any disclaimer, the term of this patent is extended or adjusted under 35 U.S.C. 154(b) by 0 days.

(21) Appl. No.: 13/752,451

(22) Filed: Jan. 29, 2013

(51) Int. Cl.
- *B32B 3/00* (2006.01)
- *B32B 3/06* (2006.01)
- *B32B 33/00* (2006.01)

(52) U.S. Cl.
USPC ................ 428/88; 428/95; 428/96; 428/156; 428/192

(58) Field of Classification Search
USPC ............... 428/95, 88, 96, 131, 137, 156, 157, 428/167, 192; 264/328.1, 241, 243, 257, 264/273, 271.1, 259
See application file for complete search history.

(56) References Cited

U.S. PATENT DOCUMENTS

| | | | |
|---|---|---|---|
| 2,837,455 A * | 6/1958 | Wolf | 428/139 |
| 4,016,318 A | 4/1977 | DiGoia et al. | |
| 4,491,556 A * | 1/1985 | Fujii et al. | 264/243 |
| 4,579,764 A | 4/1986 | Peoples et al. | |
| 4,952,358 A | 8/1990 | Okina et al. | |
| 5,034,258 A | 7/1991 | Grace | |
| 5,151,237 A * | 9/1992 | Hettinga | 264/257 |
| 5,308,570 A * | 5/1994 | Hara et al. | 264/255 |
| 5,486,320 A * | 1/1996 | Bauer | 264/408 |
| 5,616,396 A * | 4/1997 | Ueki et al. | 428/139 |
| 5,744,209 A * | 4/1998 | Parkes | 428/96 |
| 6,027,782 A | 2/2000 | Sherman | |
| 6,155,629 A | 12/2000 | Sherman | |
| 6,479,006 B1 * | 11/2002 | Kaufmann | 264/275 |
| 6,605,333 B2 * | 8/2003 | Ferreira et al. | 428/95 |
| 6,696,004 B1 * | 2/2004 | Weiner et al. | 264/257 |
| 6,764,621 B2 * | 7/2004 | Schwaighofer | 264/46.5 |
| 7,464,791 B2 * | 12/2008 | Cooksey et al. | 181/296 |
| 2006/0099387 A1 * | 5/2006 | Parkes et al. | 428/156 |
| 2011/0203717 A1 * | 8/2011 | Yamada | 156/72 |
| 2012/0034409 A1 * | 2/2012 | Price et al. | 428/67 |

* cited by examiner

*Primary Examiner* — Cheryl Juska
(74) *Attorney, Agent, or Firm* — Frank Marino

(57) ABSTRACT

A floor mat includes a perforated carpet and a thermoplastic rubber base. The base is formed around the perimeter of the carpet and through the carpet's perforations so that it integrates with the carpet and forms ribs and bosses adjacent the perforations, while leaving portions of the carpet exposed. The portions are left exposed by pinch-off ribbing within in the mold for forming the mat, which isolates the portions from the base.

28 Claims, 5 Drawing Sheets

MAT WITH OVER-MOLDED WEB

FIELD OF THE INVENTION

The present invention is related to mats and similar items. More specifically, the present invention is related to mats constructed of a plurality of materials. Even more specifically, the present invention is related to floor mats having a second portion molded over and around a first portion.

BACKGROUND

Matting of various materials and combinations of materials is well known. Mats combining rubber portions and carpeted portions are well known. Such prior art mats are either produced by gluing a carpet blank to a rubber base, or by molding a rubber frame to a carpet blank where the carpet blank has a plasticized underside to bond to the rubber.

A disadvantage common to such prior art mats is an inability to reliably bond the carpet to the rubber. Such prior art mats are prone to delamination.

Another disadvantage common to such prior art mats is that the carpeted portions and rubber portions are distinct and have differing degrees of flexibility, which often results in stress failures at the boundary lines there-between. A continuous flexibility across the mat was heretofore impossible.

Another disadvantage common to such prior art mats lies in their inability to fully integrate the rubber and the carpet for both aesthetic and functional improvement. Such prior art mats have carpeted "islands" surrounded by rubber perimeters, but rubber ribs or such could not be positioned across or within the carpeted area for such useful purposes as comfort, support, or show-scraping, or for aesthetic advantages such as rubber logos or rubber patterns within the carpeted areas.

Another disadvantage common to such prior art mats lies in the odor, off-gassing, and flammability of the glues and bonding chemicals used.

There exists a need for improvement in mats to more reliably bond the carpet to the rubber, and such is an object of the present invention. There exists a need for improvement in mats to provide continuous flexibility across the mat, and such is an object of the present invention. There exists a need for improvement in mats to integrate the rubber and the carpet for both aesthetic and functional improvement, and such is an object of the present invention. There exists a need for odor reduction, off-gassing reduction, and flammability reduction in mats and such is an object of the present invention.

Further needs and objects exist which are addressed by the present invention, as may become apparent by the included disclosure of an exemplary embodiment thereof.

SUMMARY OF THE INVENTION

In a broader form, the invention may be practiced in a mat having at least two areas of different materials wherein a first material is molded through and around a perforated blank of a second material. In the instant exemplary embodiment, a floor mat is made of rubber molded through and around a perforated blank of carpet.

As shown herein, the invention may be practiced in a mat made of a panel and a base. The panel may have a perimeter, a top side, a bottom side, and one or more perforations from the top side through to the bottom side. The base may be of a material from the group including plastic and rubber. The base may be formed around the perimeter and through the one or more perforations to integrate the base with the top and bottom sides around the perimeter and adjacent the one or more perforations while leaving the one or more portions of the top and bottom sides exposed.

Both the mat and the panel may be generally horizontally planar. The base may have a raised periphery extending outwardly from the perimeter such that the mat is a tray capable of containing liquids therein. The base may include one or both of ribs and bosses projecting upwardly from the top side adjacent the one or more perforations. The base may be thermoplastic rubber formed by molding. The base may be formed around the perimeter and through the one or more perforations by insert injection molding.

The invention may be embodied in such a mat in combination with the insert injection molding thereof and a mold for use therein, wherein the one or more portions of the top and bottom sides is left exposed by pinch-off ribbing within in the mold which isolates the one or more portions from the base.

The panel may be a carpet blank wherein the top side is carpet fibers and the bottom side is one of plastic, plastic rubber, and rubber.

The invention may alternatively be exemplified by a mat made of a panel and a base, the panel having a top side, a bottom side, and having one or more perforations from the top side through to the bottom side; and the base being of a material that is formable in a liquid phase and subsequently converts to a more solid phase. The base may be formed during its liquid phase through the one or more perforations to integrate the base with the top and bottom sides adjacent the one or more perforations after converting to its more solid phase, while leaving the one or more portions of the top and bottom sides exposed.

Both the mat and the panel may be generally horizontally planar. The base may include one or both of ribs and bosses projecting upwardly from the top side adjacent the one or more perforations. The base may be thermoplastic rubber, formed by molding. The base may be formed through the one or more perforations by insert injection molding.

The invention may be embodied in such a mat in combination with the insert injection molding thereof and a mold for use therein, wherein the one or more portions of the top and bottom sides is left exposed by pinch-off ribbing within in the mold which isolates the one or more portions from the base.

The panel may be a carpet blank with the top side being carpet fibers and the bottom side being one of plastic, plastic rubber, and rubber.

The invention may further be embodied in a floor mat made of a carpet and a base; the carpet having a perimeter, a top side, a bottom side, and having one or more perforations from the top side through to the bottom side; and the base being made of thermoplastic rubber that has a liquid phase when heated and that solidifies to a rubber phase when cooled. The base may be formed around the perimeter and through the one or more perforations during its heated liquid phase so that it integrates with the top and bottom sides as it cools to its rubber phase around the perimeter and adjacent the one or more perforations, forming one or both of rubber ribs and rubber bosses adjacent the one or more perforations, while leaving the one or more portions of the top and bottom sides as exposed carpet.

Further features and aspects of the invention are disclosed with more specificity in the Detailed Description and Drawings of an exemplary embodiment provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is now made to FIGS. 1 through 14, where there is shown an exemplary automotive floor mat 100 and an exemplary injection molding process for the manufacture thereof according to aspects of the invention.

Figure 1:
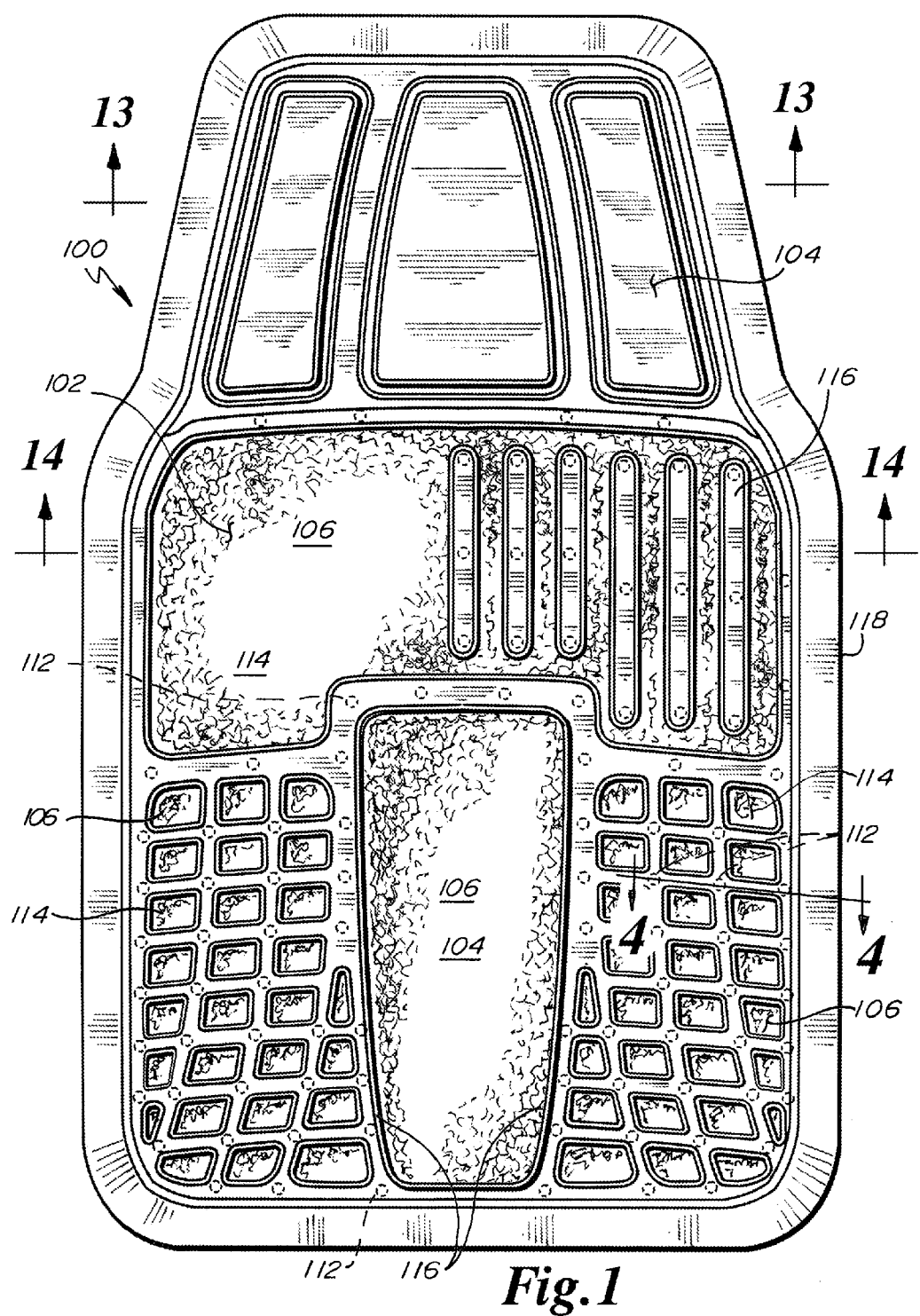
FIG. 1 is a plan view of an automotive floor mat according to an exemplary embodiment of the invention.
Figure 6:
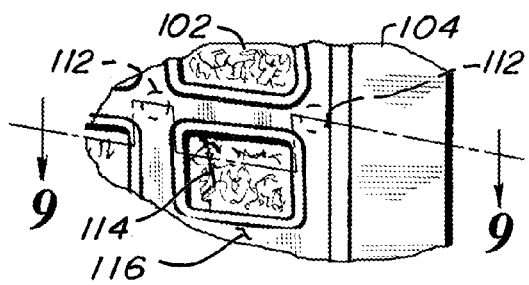
FIG. 6 is a partial plan view of the mat of FIG. 1.

Referring first to FIGS. 1 and 6, mat 100 is made of a perforated carpet blank 102 molded into a thermoplastic rubber (TPR) base 104. The end-product mat thus consists of carpeted areas 114, upper rubber areas 116 disposed over the carpet blank, lower rubber areas 117 disposed under the carpet blank, and an outer rubber portion 118 extending beyond and around the carpet blank. The rubber areas and outer rubber portion are integrally formed on and around the carpet blank.

Figure 2:
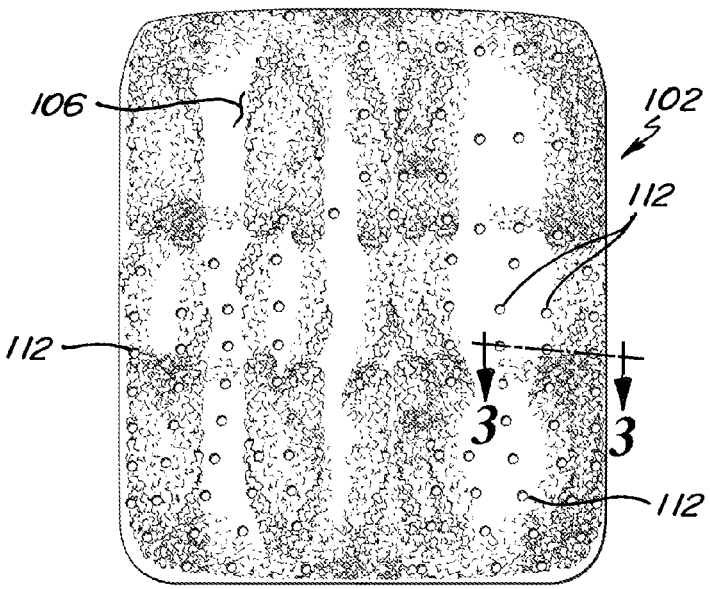
FIG. 2 is a plan view of the perforated carpet blank of the mat of FIG. 1.
Figure 3:
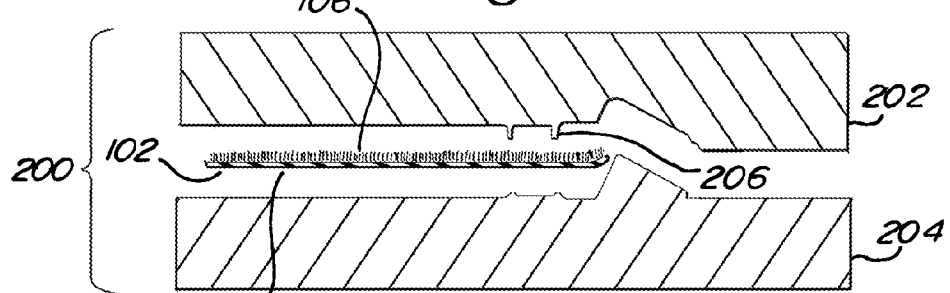
FIG. 3 is a partial cross-sectional view through a mold for producing the mat of FIG. 1 and through the carpet blank of FIG. 2 taken at Line 3-3 of FIG. 2, prior to molding.
Figure 7:
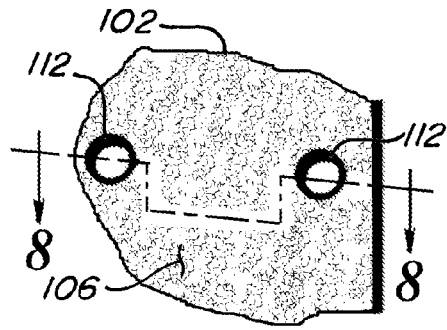
FIG. 7 is a partial plan view of the carpet blank of FIG. 2.
Figure 8:
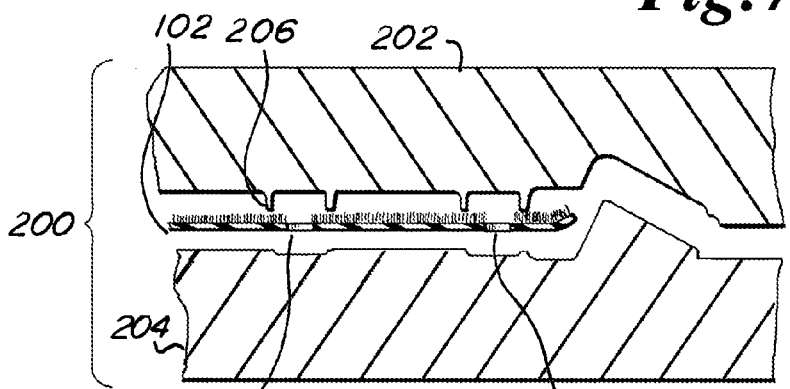
FIG. 8 is a partial cross-sectional view through the mold of FIG. 3 and through the carpet blank of FIG. 2 taken at Line 8-8 of FIG. 7, prior to molding.

The carpet blank is shown alone prior to TPR molding in FIGS. 2 and 7, and can also be seen in partial cross section in FIGS. 3 and 8. The carpet blank has a fibrous top layer 106 undercoated by a plastic layer 108. Perforations 112 pass through both layers and are arranged in a pattern around the carpet which is selected to correspond with the rubber areas 116 and 117 of the TPR base.

Figure 4:
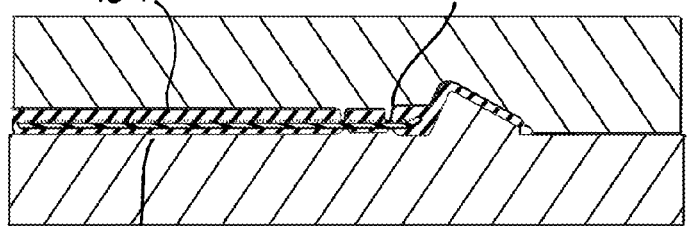
FIG. 4 is a partial cross-sectional view through the mold of FIG. 3 and through the mat of FIG. 1 taken at Line 4-4 of FIG. 1, during molding.
Figure 5:
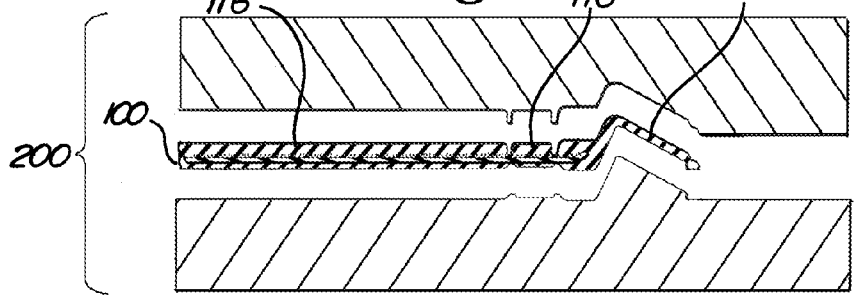
FIG. 5 is a partial cross-sectional view through the mold of FIG. 3 and through the mat of FIG. 1 taken at Line 4-4 of FIG. 1, after molding.
Figure 9:
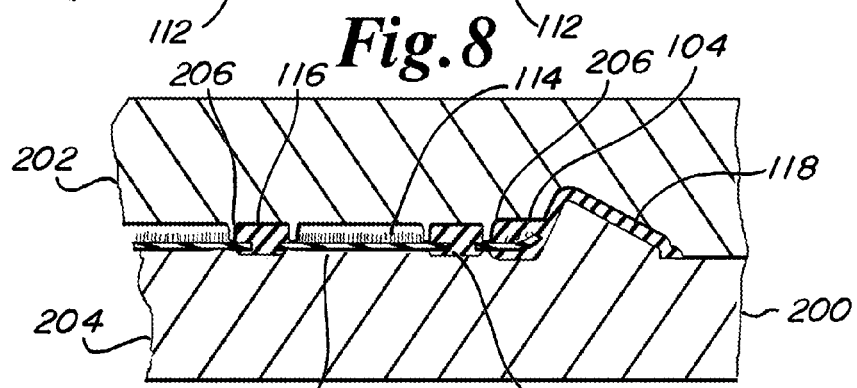
FIG. 9 is a partial cross-sectional view through the mold of FIG. 3 and through the mat of FIG. 1 taken at Line 9-9 of FIG. 6, during molding.
Figure 10:
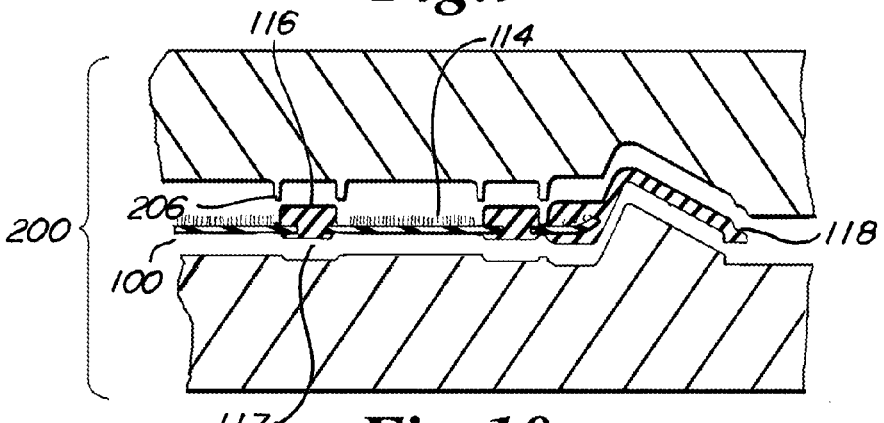
FIG. 10 is a partial cross-sectional view through the mold of FIG. 3 and through the mat of FIG. 1 taken at Line 9-9 of FIG. 6, after molding.

FIGS. 3 through 5 depict the molding sequence through a line of perforations taken at Line 4-4 of FIG. 1 and Line 3-3 of FIG. 2. FIGS. 8 through 10 depict the molding sequence through both perforated and non-perforated areas taken at Line 9-9 of FIG. 6 and Line 8-8 of FIG. 7.

The exemplary molding process includes and may be considered a variation of existing insert injection molding, except with improvements. In traditional insert injection molding, a component is positioned in the open mold prior to closing the mold and injecting molten plastic resin around the component to at least partially encapsulate it and bond it to the plastic as the plastic cures and hardens. The present arrangement and process advances the bonding while providing significant structural, function, and aesthetic advances.

Referring to FIGS. 3 and 8, the carpet blank is positioned within the top plate 202 and bottom plate 204 of injection mold 200. When the mold is closed, as in FIGS. 4 and 9, the upper rubber areas 116 and outer rubber portion 118 are in communication with feed gates (not shown) for supplying pressurized molten TPR resin, but the carpeted areas 114 intended to be left exposed in the end-product mat are isolated within a series of peripheral pinch-off ribs 206 of top plate 202. These closed-loop ribs pinch off around areas of the blank just hard enough to prevent the pressurized molten TPR resin from passing through to the pinched-off carpeted areas but do not pinch off hard enough to permanently deform the fibers of the carpet. On the upper side of the carpet blank, the molten TPR resin is thereby injected only into the upper rubber areas 116 and outer rubber portion 118, leaving the carpet exposed in the carpeted areas 114.

The molten TPR resin also passes though the perforations 112 which are intentionally disposed to align with the upper rubber areas 116 and lower rubber areas 117, so that the resin fills only the lower rubber areas on the underside of the carpet blank.

Figure 11:
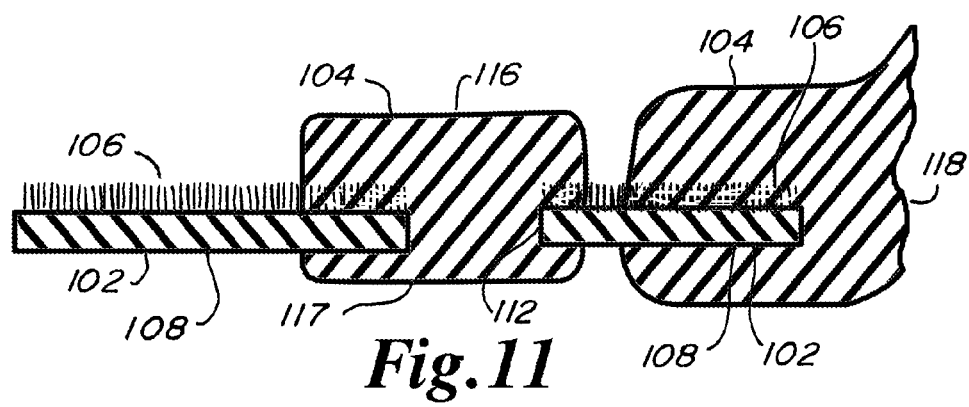
FIG. 11 is a partial cross-sectional view through a typical rubber area of the mat of FIG. 1.

This arrangement serves several important functions, including;

1) In the end-product mat, these lower rubber areas provide support footings and give the mat structural integrity; and
2) Referring to FIG. 11 it can be seen in greater detail that the TPR within the perforation and within the upper and lower rubber areas, all integrally formed through and around the perforation and bound to both the fibrous top layer 106 and plastic layer 108 of the carpet blank provide a most effective and permanent bond between the TPR and the carpet blank; adhesively, structurally, and sealingly.
3) The TPR in the upper rubber areas encapsulates the carpet fibers therein to further the mechanical bond between the carpet blank and TPR base.
4) The hot molten TPR temporarily softens the plastic layer on the underside of the carpet blank in the lower rubber areas and is effectively welded thereto so that a permanent and very reliable waterproof seal is created between the carpet blank and the TPR base. Since the perimeter of the outer rubber portion is a raised rim around the mat, the mat is made a tray capable of holding water and mud collected therein and preventing it from seeping through to the automobile.
5) The hot molten and pressurized TPR chemically reacts with the plastic layer and carpet fibers and is effectively fused thereto so that a chemical bond is made therebetween in addition to the afore-stated mechanical bond.

Figure 13:
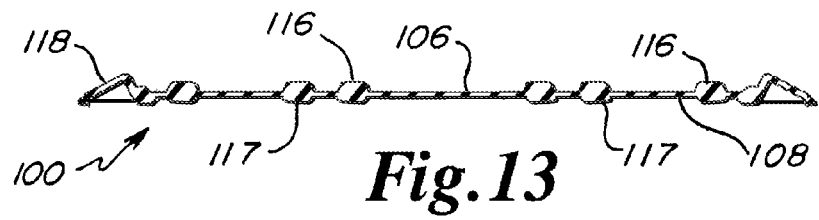
FIG. 13 is a cross-sectional view through the mat of FIG. 1 taken at Line 13-13 of FIG. 1.
Figure 14:
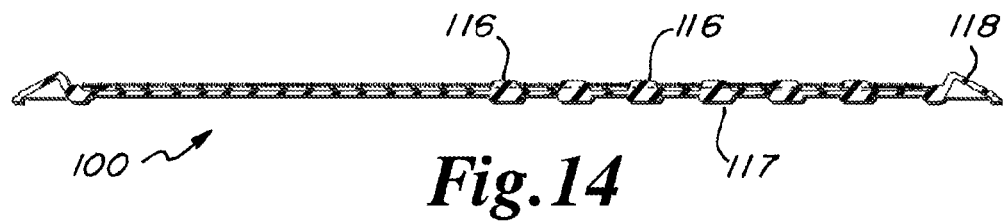
FIG. 14 is a cross-sectional view through the mat of FIG. 1 taken at Line 14-14 of FIG. 1.
Figure 12:
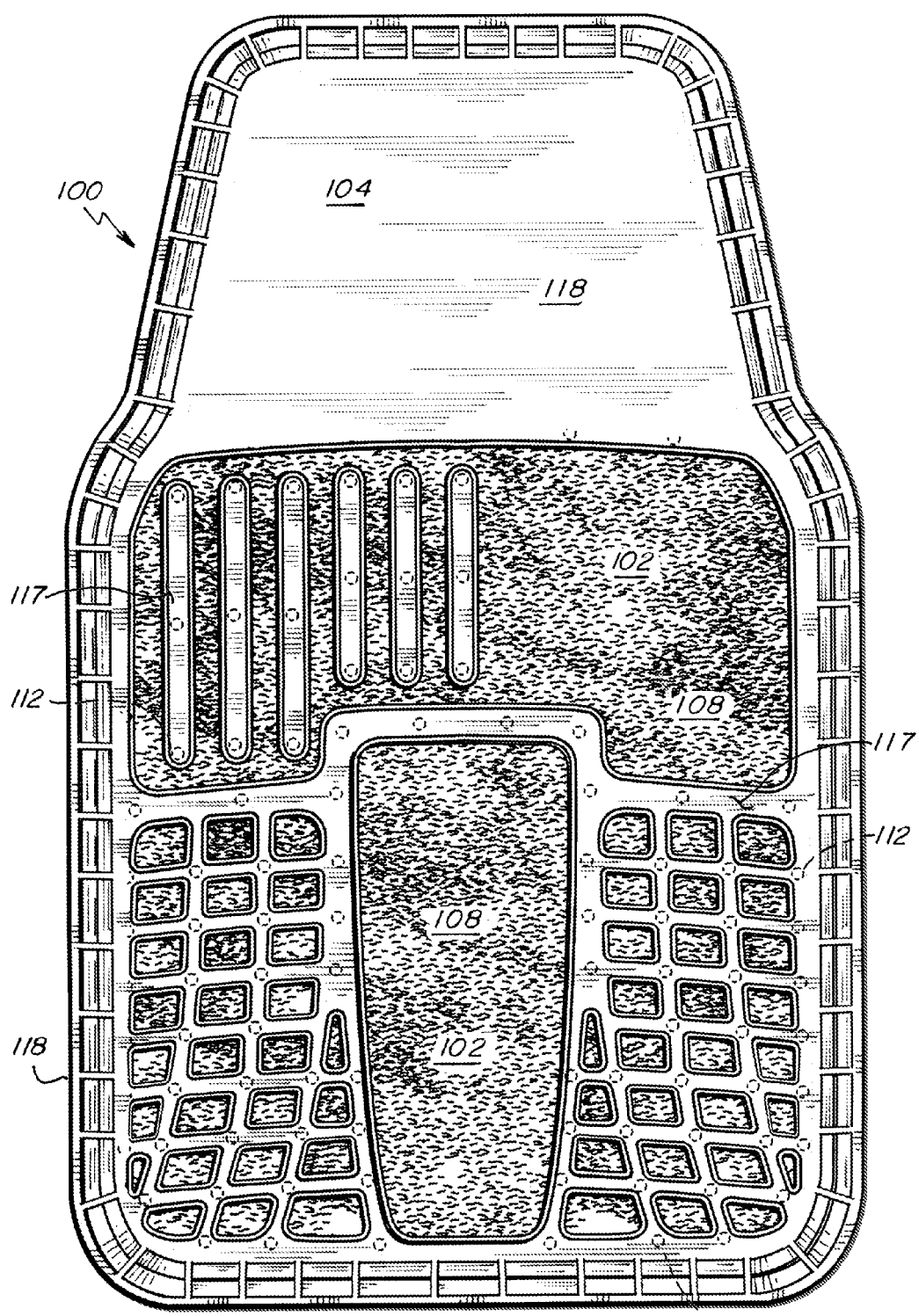
FIG. 12 is a bottom view of the mat of FIG. 1.

FIG. 12 shows a bottom view of the mat where it can be seen that the lower rubber areas 117 also overlie the pattern of the carpet blank's perforations 112. FIGS. 13 and 14 are cross sections taken at Lines 13-13 and 14-14 of FIG. 1, respectively, to show the topography of the mat so it can be appreciated that the upper rubber areas 116 serve as both user support ribs and shoe scraping features.

FIG. 13 is a cross-sectional view through the mat of FIG. 1 taken at Line 13-13 of FIG. 1; FIG. 14 is a cross-sectional view through the mat of FIG. 1 taken at Line 14-14 of FIG. 1.

Of course, the invention lies in many aspects beyond the specific materials, process, and product shown and described above. For instance, the molten resin could be gated into the underside of the mat, or the base may be cast to and/or around the blank. And while automotive floor mats provide an ideal opportunity to practice the invention and numerous new and non-obvious benefits of the invention are realized in such a product, it is expected that the invention could be useful when applied to many other products, including but not limited to household and industrial floor mats, trays, drip pans, welcome mats, and similar items. The carpet blank could be replaced by some other perforated blank, such as fabric, wood or stone. And the TPR could be replaced by any material that is capable of being formed during a liquid phase and subsequently converting to a more solid phase; such as plastic, cement, or epoxy. And the injection molding process could be replaced by any adaptable form of casting or molding, without departing from the intent of the invention.

So while the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

We claim:

1. A mat comprising a panel and a base;
   the panel having a perimeter, a top side, a bottom side, and having one or more perforations from the top side through to the bottom side, inboard of the perimeter;
   the base being of a material from the group including plastic and rubber;
   the base formed around the perimeter and through the one or more perforations to integrate the base with the top and bottom sides around the perimeter and adjacent the one or more perforations while leaving the one or more portions of the top and bottom sides exposed.

2. The mat of claim 1 wherein both the mat and the panel are generally horizontally planar.

3. The mat of claim 2 where in the base has a raised periphery extending outwardly from the perimeter such that the mat comprises a tray capable of containing liquids therein.

4. The mat of claim 3 wherein the base comprises one or both of ribs and bosses projecting upwardly from the top side adjacent the one or more perforations.

5. The mat of claim 4 wherein the base is thermoplastic rubber.

6. The mat of claim 5 wherein the base is formed by molding.

7. The mat of claim 6 wherein the base is formed around the perimeter and through the one or more perforations by insert injection molding.

8. The mat of claim 7 made by inserting the panel in a mold and molding the base around the perimeter and through the one or more perforations; wherein the one or more portions of the top and bottom sides is left exposed by pinch-off ribbing within the mold which isolates the one or more portions from the base.

9. The mat of claim 8 wherein the panel is a carpet blank.

10. The mat of claim 9 wherein the top side comprises carpet fibers; and the bottom side comprises one of plastic, plastic rubber, and rubber.

11. The mat of claim 1 wherein the panel is a carpet blank.

12. The mat of claim 11 wherein the top side comprises carpet fibers; and the bottom side comprises one of plastic, and rubber.

13. The mat of claim 8 wherein the panel is from the group including a flexible substrate, a textile, and a laminate.

14. The mat of claim 13 wherein one or both of the top side and bottom side comprises one or more of carpet fibers, plastic, plastic rubber, rubber, and fabric.

15. A mat comprising a panel and a base;
    the panel having a perimeter, a top side, a bottom side, and having one or more perforations from the top side through to the bottom side, inboard of the perimeter;
    the base being of a material that is formable in a liquid phase and subsequently converts to a more solid phase;
    the base formed during its liquid phase through the one or more perforations to integrate the base with the top and bottom sides adjacent the one or more perforations after converting to its more solid phase, while leaving the one or more portions of the top and bottom sides exposed.

16. The mat of claim 15 wherein both the mat and the panel are generally horizontally planar.

17. The mat of claim 16 wherein the base comprises one or both of ribs and bosses projecting upwardly from the top side adjacent the one or more perforations.

18. The mat of claim 17 wherein the base is thermoplastic rubber.

19. The mat of claim 18 wherein the base is formed by molding.

20. The mat of claim 19 wherein the base is formed through the one or more perforations by insert injection molding.

21. The mat of claim 20 made by inserting the panel in a mold and molding the base around the perimeter and through the one or more perforations; wherein the one or more portions of the top and bottom sides is left exposed by pinch-off ribbing within the mold which isolates the one or more portions from the base.

22. The mat of claim 21 wherein the panel is a carpet blank.

23. The mat of claim 22 wherein the top side comprises carpet fibers; and the bottom side comprises one of plastic, plastic rubber, and rubber.

24. The mat of claim 15 wherein the panel is a carpet blank.

25. The mat of claim 24 wherein the top side comprises carpet fibers; and the bottom side comprises one of plastic, and rubber.

26. The mat of claim 21 wherein the panel is from the group including a flexible substrate, a textile, and a laminate.

27. The mat of claim 26 wherein one or both of the top side and bottom side comprises one or more of carpet fibers, plastic, plastic rubber, rubber, and fabric.

28. A floor mat comprising a carpet and a base;
    the carpet having a perimeter, a top side, a bottom side, and having one or more perforations from the top side through to the bottom side, inboard of the perimeter;
    the base being made of thermoplastic rubber that has a liquid phase when heated and that solidifies to a rubber phase when cooled;
    the base formed around the perimeter and through the one or more perforations during its heated liquid phase so that it integrates with the top and bottom sides as it cools to its rubber phase around the perimeter and adjacent the one or more perforations, forming one or both of rubber ribs and rubber bosses adjacent the one or more perforations, while leaving the one or more portions of the top and bottom sides as exposed carpet.

* * * * *